United States Patent [19]
Frink

[11] Patent Number: 5,986,602
[45] Date of Patent: Nov. 16, 1999

[54] PULSE RADAR DEVICE AND METHOD

[75] Inventor: Bentley D. Frink, Shallotte, N.C.

[73] Assignee: Remote Data Systems, Inc., Whiteville, N.C.

[21] Appl. No.: 09/033,361

[22] Filed: Mar. 2, 1998

[51] Int. Cl.⁶ ................................................ G01S 13/36
[52] U.S. Cl. ...................... 342/126; 342/127; 342/128
[58] Field of Search ................................. 342/126, 118, 342/123, 124, 127, 128

[56] References Cited

U.S. PATENT DOCUMENTS

| | | | |
|---|---|---|---|
| 5,345,471 | 9/1994 | McEwan | 375/1 |
| 5,465,094 | 11/1995 | McEwan | 342/28 |
| 5,517,198 | 5/1996 | McEwan | 342/89 |
| 5,523,760 | 6/1996 | McEwan | 342/89 |
| 5,563,605 | 10/1996 | McEwan | 342/202 |
| 5,610,611 | 3/1997 | McEwan | 342/89 |
| 5,661,490 | 8/1997 | McEwan | 342/387 |

*Primary Examiner*—John B. Sotomayor
*Attorney, Agent, or Firm*—Rhodes & Mason, PLLC

[57] ABSTRACT

The distance to a target is determined by transmitting a radio frequency signal comprised of a plurality of pulses to a target from a transmitter at a given transmission time, receiving a plurality of return scans at a receiver, selecting a scan meeting a predetermined parameter that includes a reflected pulse; comparing the scan with a template of a reflected pulse at different locations to select the time at which the match between the scan and the template have the closest match; and calculating the distance to the target. The signal is transmitted and received through a wall of an aperture-free container that is transparent of said radio frequency pulses. The device also includes a barrier plate that is opaque to radio frequency pulses between the transmitter and receiver.

35 Claims, 14 Drawing Sheets

|   | C | D | E | F | G |
|---|---|---|---|---|---|
| 1 | PHYSICAL LOCATION (FT) | TARGET LOCATION | FIDUCIAL LOCATION | SAMPLES/ SCAN | (TARGET-FIDU)/ SAMPLES |
| 2 |   |   |   |   |   |
| 3 | 3.00 | 1350 | 606 | 3143 | 0.2367 |
| 4 | 4.00 | 1604 | 607 | 3140 | 0.3175 |
| 5 | 5.00 | 1855 | 606 | 3140 | 0.3378 |
| 6 | 6.00 | 2109 | 606 | 3140 | 0.4787 |
| 7 | 7.00 | 2364 | 606 | 3138 | 0.5602 |
| 8 | 8.00 | 2618 | 607 | 3138 | 0.6409 |
| 9 | 9.00 | 2874 | 607 | 3137 | 0.7227 |
| 10 | 10.00 | 3132 | 606 | 3137 | 0.8052 |

SAMPLE CALIBRATION RUN

FIG. 6A

|   | K | L | M | N |
|---|---|---|---|---|
| 1 | REGRESSION OUTPUT | | | |
| 2 | CONSTANT | | | 0.092325 |
| 3 | STD ERR OF Y EST | | | 0.009923 |
| 4 | R SQUARED | | | 0.999986 |
| 5 | NO. OF OBSERVATIONS | | | 8 |
| 6 | DEGREES OF FREEDOM | | | 6 |
| 7 |   |   |   |   |
| 8 | X COEFFICIENT(S) | | 12.32351 | |
| 9 | STD ERR OF COEF. | | 0.01887 | |

REGRESSION OUTPUT

FIG. 6B 5,986,602

PULSE RADAR DEVICE AND METHOD

BACKGROUND OF THE INVENTION

(1) Field of the Invention

The present invention relates generally to a device and method for measuring the distance to a target, and in particular to the processing of low power signals comprised of a plurality of energy pulses to determine the distance to a target with a high degree of accuracy, particularly when the distance to the target changes over a period of time.

(2) Description of the Prior Art

Various devices and related methods are known in the prior art for determining the distance to a target. Generally, these devices include a transmitter to send a signal to the target, a receiver to capture the echo or reflected signal from the target, and a processor for calculating the distance from the transmitter to the target based upon the time between the signal's departure and return is well known in the prior art. Various energy sources have been used to generate the signal, including sound, light, and radio waves. Most of these prior art devices require a large power source and elaborate equipment in order to be operable.

Recently, there has been considerable interest in radar systems based upon the use of low and micropower energy sources that can be operated from batteries. For example, U.S. Pat. Nos. 5,345,471, 5,465,094 and 5,523,760 to McEwan, incorporated herein in their entirety, describe a system using an ultra-wideband signal. While, other systems using ultra-wideband spectrum signals have been described in the prior art, accurate measurement of the time of return of the signal echo, due to the low power and high frequency of the signal, has been inadequate for practical uses.

In U.S. Pat. Nos. 5,661,490, 5,517,198 and 5,610,611, incorporated herein by reference, McEwan addresses this problem by time elongating the return signal, so that the signal data is effectively slowed down to allow for processing. Specifically, McEwan converts data relating to a plurality of identical return pulses, into the representation of a signal pulse identical in shape to a single pulse, but elongated over the time of the combined pulses. Therefore, with the ability to calculate with accuracy the return time of a pulse, and knowing the time of departure of the pulse, it is possible to calculate, with some degree of accuracy under controlled conditions, the distance from the signal transmitter to the target.

However, while the McEwan signal processing method is functional under controlled or laboratory conditions, it has been found that the method without modification is not commercially viable under outdoor environmental conditions, due to uncontrollable factors such as those encountered in measuring river and lake levels. Specifically, when using low power pulses of the frequency contemplated by McEwan, the return signal is usually mixed within electrical interference or "noise" that is also captured by the receiver, preventing accurate identification of the signal or an accurate determination of the time of return. Since the return signal is of such low intensity with this technology, prior art techniques for separating the signal from the interference are not useful.

Other factors not relevant to laboratory conditions, in particular temperature changes, also prevent measurements with the high degree of accuracy required for many potential applications of the McEwan method. Under laboratory conditions, the time when the signal transmission is initiated can be used as the base or starting point for time measurement, since the time increment between signal initiation and actual transmission under the same conditions is not a variable. However, changing temperature conditions may be experienced when using the system in uncontrolled environments.

If so, the time between signal initiation and actual signal transmission with vary due to electronic draft and component variation. While this variation may be only on the order of about 0.05 nanoseconds, the effect on measurement accuracy can be significant. For example, a temperature change of 10° C. can change the time of signal transmission by 0.25 nanoseconds. When attempting to measure a target located at a distance of 3 meters, this temperature change can result in an error of as much as 3 centimeters.

Many potential applications of radar are in outdoor environments. If so, the device may be damaged, or its function impaired, by rain, snow, insects, and other foreign matter present in outdoor environments. Therefore, the device must be designed in a way that prevents entry into the apparatus of foreign matter. Ideally, the entire device would be sealed within a container with no openings or apertures. Normally, however apertures are required for egress of the transmitted signal and ingress of the return signal. These openings are of primary concern in designing a device that is impervious to external conditions and foreign matter.

Numerous applications exist for radar devices using low power signal sources, provided that the preceding factors limiting use of this technology in external and other uncontrolled environments can be overcome.

SUMMARY OF THE INVENTION

The present invention provides an improved radar device and a method for accurately determining the time at which a reflected signal is received from a target. A method for accurately identifying the time of signal transmission is also provided. In addition, the invention relates to a method using the accurate identification of the transmittal and/or receipt of the signal to determine the distance from the device to a target, especially to determining changes in the relative positions of the device and target over time. In addition, a device design providing improved environmental protection for the device components is provided.

As noted earlier, the prior art discloses transmission of a high frequency, low power pulses toward a target at a given time, recording of the return time of the reflected signal from the target, and calculation of the distance to the target from the point of transmission, or a point at a known distance from the point of transmission, based upon the given time and the return time. The present method adds additional steps to this method to render the method useful in uncontrolled conditions. As used herein, the term "uncontrolled conditions" is intended to mean operating conditions under which one or more external factors exist that affect calculation of the transmitted or return signal.

In order to accurately calculate the distance to a target, it is necessary to calculate with a high degree of accuracy the time of receipt of the reflected signal. An error of only 1 nanosecond in this measurement results in an error of 1 foot. Many potential uses of radar devices of the type described herein are in near distance measurements, i.e., distances of 60 feet or less, as well as in the measurement of changes in the location of a target that changes position over time within a relatively narrow range. An error of this magnitude negates the value of the device for these purposes.

In the present invention, a method is provided for locating the reflected signal within electronic interference or "clutter"

produced by extraneous factors, and identifying the exact time of its receipt. Basically, the method includes the step of transmitting a signal, identifying a return signal that includes the reflected signal, comparing the characteristics of the return signal with the known characteristics of the reflected signal at different times, and selecting the time at which the characteristics of the return signal match the known characteristics of the reflected signal.

Preferably, the return signal to be evaluated is identified by selecting a first signal that meets a predetermined parameter of the reflected signal, e.g., amplitude, and then selecting a second return signal that has the same predetermined parameter within a given percentage of the predetermined parameter of the first signal to ensure proper normalization and comparison with the appropriate templates.

Therefore, the preferred method for identifying the return time of a reflected signal comprises transmitting a signal formed of a plurality of pulses, receiving a plurality of return signals, selecting a first signal that meets a predetermined parameter of the reflected signal, selecting a second return signal having the same predetermined parameter within a given percentage of the predetermined parameter of the first signal, and selecting the time at which the characteristics of the return signal match the known characteristics of the reflected signal.

The characteristics of each device, and thus the characteristics of each reflected signal will ordinarily be slightly different due to variations in the device components. Therefore, each device will normally be tested under laboratory or controlled conditions at various target distances to develop a template or profile of the desired reflected pulse. This template is then "slid" along the time line of the selected return signal until a match is found. A match occurs when the template and respective received pulse echo align.

The method used to identify the return time of the reflected signal may include additional steps. In most instances, it will be necessary to convert the return signal data from analog to digital to effectively compare the return signal with known characteristics of the reflected signal. The signal may also be filtered using known digital or analog technology to remove frequencies above and below certain levels generally outside the frequency range of the reflected signal. In addition, due to the high speed of the pulses forming the signal, it will be necessary to "time expand" the pulse using, for example, the method described in the above McEwan patents.

Additionally, the return pulse, as well as the template of the known reflected pulse characteristics can be "normalized" in order to make absolute amplitude irrelevant. Normalization of a pulse is also known in the prior art, and preferably comprises dividing the individual pulse amplitudes by a given number to reduce their absolute values. For example, the highest peak amplitude can be assigned a value of 1, and the remaining peaks and valleys can be given a value of less than 1, based upon their amplitude relative the highest peak amplitude. Since both the return signal and the template are normalized in the same manner, their relative characteristics will remain the same, but their relative differences will be lessened. Therefore, the likelihood that a clutter echo could be mistaken for the actual target is greatly reduced.

Accurate calculation of the distance to the target, particularly in measurements of the kind primarily contemplated by the present invention also requires highly accurate determination of the signal transmission time. Under laboratory or controlled conditions, the time of signal initiation can be used to calculate the distance to a target, since the time increment between signal initiation and actual transmission is non-variable. However, when operating in uncontrolled conditions, differences in temperature affect this time increment, since the time increment may increase or decrease with an increase in temperature.

This variable could theoretically be accounted for by accurately determining the temperature and providing an adjustment factor in the calculation equation. However, the present invention provides a greatly simplified and more accurate method for temperature compensation. Specifically, in the present method, a segment of the transmitted signal is captured by the receiver at the time the signal leaves the transmitter. The time of receipt of this captured signal is then used as the start time for calculating distance. As will later be described in detail, the transmitted signal is captured by reflecting a segment of the transmitted signal from the transmitter to the receiver.

Using the above refinements, the distance to a target can be determined under uncontrolled conditions by a method comprising the steps of transmitting a signal toward the target at a known transmittal time, identifying a return signal that includes the reflected signal, determining the return time of the reflected signal by comparing the characteristics of the return signal with the known characteristics of the reflected signal at different times, and selecting the time at which the characteristics of the return signal match the known characteristics of the reflected signal, and calculating the distance to the target using the transmittal time and the return time.

The above method may include the previously discussed steps of converting the signal data from analog to digital, time expanding the data, and normalizing the data, in order to facilitate comparison with known characteristics. In addition, a portion of transmitted signal may be captured by the receiver at the time of transmission and the time of capture used as the transmission time.

A particularly valuable application of the present invention is its use in measuring changes in the position of a target over a period of time. For example, changes in the level of a body of water or other liquid over time can be determined by transmitting the signal downward toward the surface of the water, and periodically measuring the distance to the water surface from the transmitter using the above method. Alternatively, if the distance to the bottom of the body of liquid is known, the depth of the liquid can be calculated.

As earlier noted, use of the apparatus in external environments requires protection of the instrument components e.g., the transmitter, receiver, analog to digital converter, processor, output, recorder, etc., from water, insects and other foreign matter. One of the problems with conventional instrument packaging, however, is the presence of apertures or openings to provide signal egress and ingress.

The present invention, however, provides for housing the instrument components within a sealed, aperture-free container. Instead of using apertures, signal egress and ingress is made possible by forming at least one wall of the container from a substantially signal transparent material, and directing the transmitter discharge end and the receiver receiving end toward this wall. Substantially signal transparent materials include epoxy, fiberglass, polystyrene and Teflon®, etc. With this construction, both transmitted and return signals are able to penetrate the wall, without danger of entry of foreign matter.

Even the above listed materials, however, are not entirely transparent to signals. Therefore, a portion of the transmitted signal will be reflected back from the wall. Receipt of a substantial part of this internally reflected signal by the receiver causes "ghosting" or interference with received signals. Therefore, it is desirable to eliminate or control the amount of internally reflected signal received at the receiver.

It has been found that the undesirable effects of the internally reflected signal at the receiver can be avoided by placing a signal shielding barrier or wall between the transmitter and receiver. That is, the transmitter and receiver are positioned with their respective discharge and receiving ends toward the inner surface of a signal transparent wall. A signal opaque barrier is then positioned between the transmitter and receiver, and substantially perpendicular to the transparent wall.

If the receiver is to be completely isolated from the internally reflected signal, the forward end of the barrier, e.g., the barrier end closest the transparent wall, is positioned abutting the transparent wall. However, it has been found that this internally reflected signal can be used to determine the time of signal transmission. Specifically, instead of completely isolating the transmitter and receiver, a small quantity of the internally reflected signal is allowed to reflect onto the receiver. The time of receipt of this reflected signal segment is then recorded and used to identify the time when the transmission is sent.

Therefore, instead of positioning the forward end of the barrier abutting the transparent wall, it is desirable in this instance to space the forward end of the barrier a predetermined distance from the transparent wall. Thus, by leaving an opening of a predetermined dimension between the wall and barrier, a controlled amount of internally reflected signal is allowed to reach the receiver. The desired quantity of signal reaching the receiver may differ due to the amount of space between the barrier and the substantially electromagnetically transparent wall. Therefore, in a preferred embodiment of the invention, the forward end of the barrier is adjustable relative to the transparent wall, so that the gap between the wall and the barrier edge can be changed to adjust the signal quantity.

Accordingly, one aspect of the present invention is to provide a system and method for transmitting a pulse signal to a target and identifying the return time of reflected signal received from a target by transmitting a signal comprised of a plurality of pulses to a target, receiving a plurality of return signals, selecting a test signal meeting a predetermined parameter, and comparing the signal with a template of a desired reflected signal at different return times to select the time at which the match between the signal and the desired reflected signal have the closest match.

Another aspect of the present invention is to provide a system and method for determining the distance to a target using a pulse signal by transmitting a signal comprised of a plurality of pulses to a target at a given transmission time, receiving a plurality of return signals, selecting a test signal meeting a predetermined parameter, comparing the signal with a template of a desired reflected signal at different return times to select the time at which the match between the signal and the desired reflected signal have the closest match, said time being the reflected signal return time, and calculating the distance to the target from the device from the transmission time and the reflected signal return time.

Still another aspect of the present invention is to provide a radar device comprised of a transmitter adapted to transmit radio frequency pulses, the transmitter having a discharge end; a receiver adapted to received reflected pulses created by the radio frequency pulses, the receiver having a discharge end; a radio frequency opaque, barrier plate between the transmitter and the receiver; and an aperture-free container surrounding the transmitter and the receiver, the container including a wall that is transparent of the radio frequency pulses, the wall having an inner surface being positioned in front of the transmitter and receiver discharge ends, and the barrier plate.

These and other aspects of the present invention will become apparent to those skilled in the art after a reading of the following description of the preferred embodiment.

BRIEF DESCRIPTION OF THE DRAWINGS

FIG. 6A is a sample calibration run constructed according to the present invention;

FIG. 6B is a regression output constructed according to the present invention;

DETAILED DESCRIPTION OF THE PREFERRED EMBODIMENT

Figure 1:
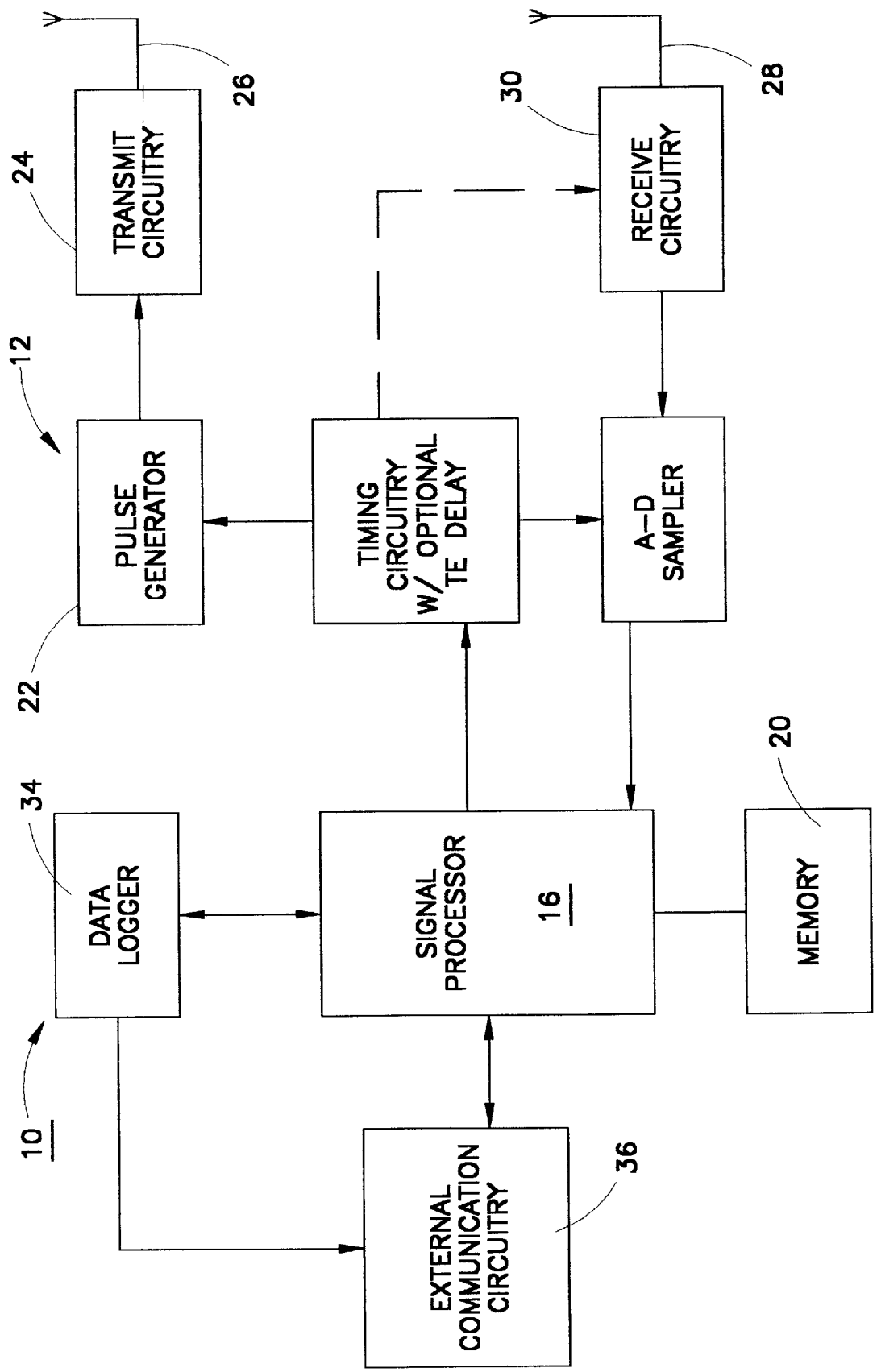
FIG. 1 is a schematic block diagram of the radar electronics constructed according to the present invention.

In the following description, like reference characters designate like or corresponding parts throughout the several views. It is to be understood that descriptive terms and the like are words of convenience and are not to be construed as limiting terms. Referring now to the drawings in general, and FIG. 1 in particular, it will be understood that the illustrations are for the purpose of describing preferred embodiments of the invention and are not intended to limit the invention thereto.

FIG. 1 is a schematic representation of the electronics preferably used to carryout the present invention. The electronics provide a pulse radar device, generally designated 10, adapted to precisely determine the length of time a pulse travels and thereby determine a proportional distance traveled by that pulse. The pulse radar device includes three primary subsystems: a transmitter 12, a receiver 14 and the necessary processing and timing circuitry described below. The transmitter will generally include a pulse generator 22, transmit circuitry 24 and an antenna 26. The receiver will include an antenna 28, receive circuitry 30 and possibly an analog to digital converter or signal sampler 32. The sampler 32 may be separate, or integrated with the signal processor or receive circuitry 30. Those skilled in the art should recognize the varying configuration of the sampler circuitry 32 as well as the remaining circuitry necessary to transmit, receive and process the signals according to the present invention. The processing and timing circuitry will include a signal processor 16, timing circuitry 18 and memory 20. The signal processor 16 may also cooperate with a data logger 34 and external communication circuitry 36 for storing collected data and communicating such data for further use and processing apart from the pulse radar device 10.

In the preferred embodiment, the present invention is configured to compensate for drifts in the various electronic components of the pulse radar device 10 caused by temperature and environmental effects and component variation by monitoring the time a transmitted pulse leaves the pulse radar device and monitoring the time when an echo off a target surface for the given pulse is received. The initial echo or reflection, representing the time a pulse is transmitted, will be referred to hereinafter as the fiducial echo. The echo of the transmitted pulse from the target will be referred to as the target echo.

Figure 2:
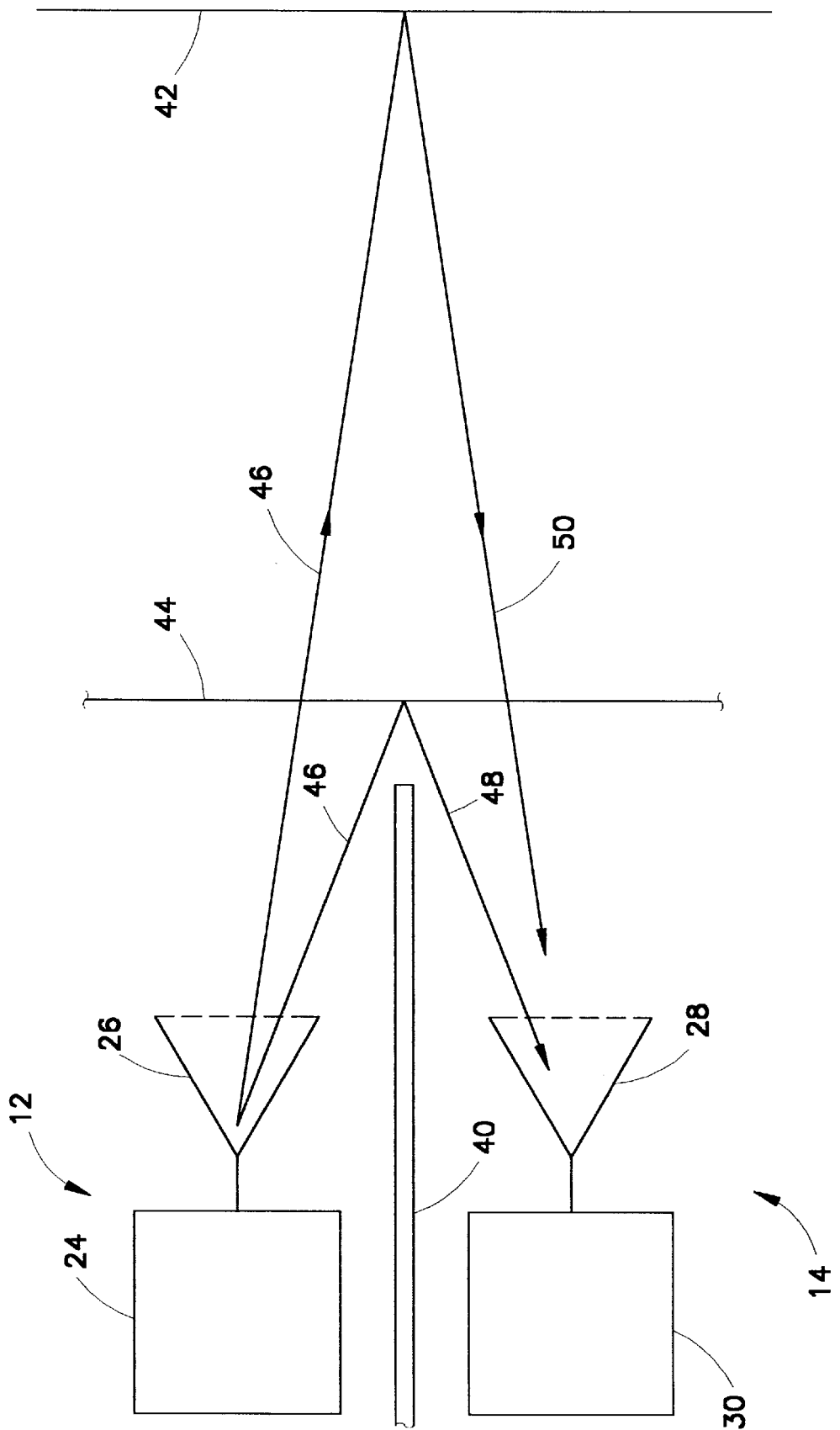
FIG. 2 is a schematic representation of a cross-section of the pulse radar device constructed according to the present invention.

With reference to FIG. 2, a cross-sectional view of a block representation of the present invention is shown. The transmitter is shown with the necessary transmit circuitry 24 and a directional antenna 26. The receiver 14 is shown with the necessary received circuitry 30 and a directional antenna 28, similar to the transmit antenna 26. Also depicted is a shielding barrier 40 separating the transmit and receive antennas 26, 28, a substantially electromagnetically transparent wall 44, which typically forms part of an enclosure for the electronics, and a target surface 42.

The shielding barrier 40 is preferably spaced apart from the wall 44 to enable portions of the transmitted pulse 46 to be reflected back toward the receive antenna 28. Although the target surface 42 is shown vertical and substantially flat, the target surface may take on any configuration and the electronics may be configured or oriented in any number of configuration as the application requires.

Figure 3A:
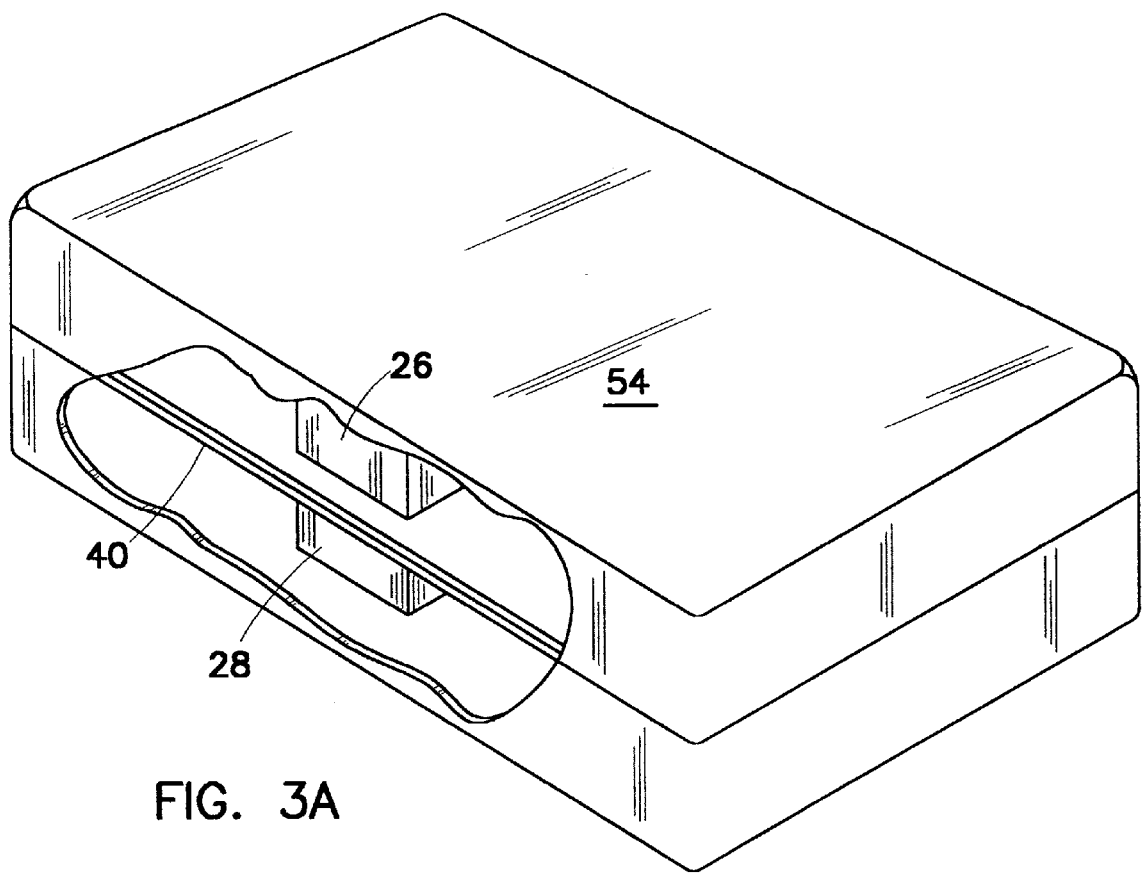
FIG. 3A is a perspective view of the pulse radar device in a substantially sealed enclosure constructed according to the present invention.
Figure 3B:
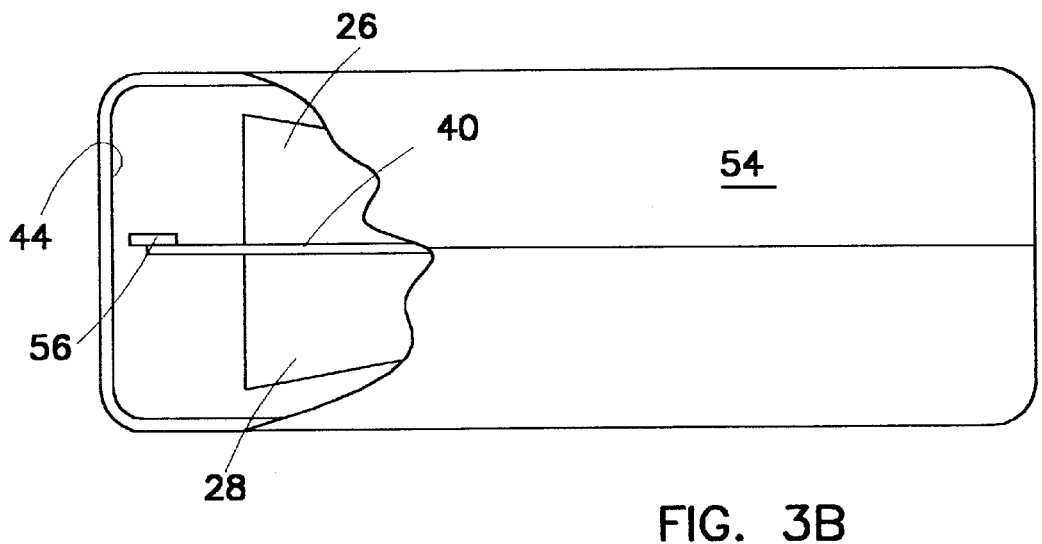
FIG. 3B is a side view of the pulse radar device constructed according to the present invention.

Preferably, the electronics of the pulse radar device 10 is substantially enclosed in a box 54 as shown in FIGS. 3A and 3B. External communication circuitry may be provided using wireless technology capable of transmitting and receiving through the enclosure 54 or using environmentally sound electronic connectors providing electronic passage through the box. A shield position adjustment 56 may be placed at the end of a shield 40, which separates the respective transmit and receive antennas 26,28 in order to adjust the amount of the transmission pulse 46 reflected off of the wall 44 and back towards the receive antenna 28 in the form of the fiducial echo 48. Extending the adjusting means 56 towards the wall 44 will decrease the amount of reflection while moving the reflecting means away from the wall will increase the amount of fiducial echo.

In operation, a transmit pulse, designated 46, is transmitted from the antenna 26 toward the target 42. A portion of the transmitted pulse 46 is substantially immediately reflected by the wall 44 toward the receive antenna 28. As noted, the reflected portion of the transmitted pulse 46 is the fiducial echo 48. A portion of the transmitted pulse 46 passing through the wall 44 will reflect off of the target surface 42. That portion of the target echo 50 returning toward the impulse radar device 10, will pass back through the wall 44 and be received by the antenna 28.

Since the transmitted pulse 46 travels at a finite speed, the fiducial echo 48 and the target echo 50 are received at different times. The difference in receipt of the fiducial and target echoes 48, 50 represent a precise approximation of the actual time between transmission of a pulse and receipt of a corresponding target echo without being influenced by electronic component drift or a variation. Given the significant speed in which the signals travel, it is extremely difficult to determine the precise time a pulse is transmitted. Prior to the present invention, time of travel calculations were referenced to a transmit trigger signal under laboratory conditions. In practice, component variations greatly effect the time between the trigger signal and the actual transmission of a pulse with respect to the significant speed at which the pulse travels. A small deviation between the time at which a trigger is received and the pulse is transmitted will equate to a significant portion of the time the pulse travels between the transmitter and receiver, thus significantly affecting time of flight and distance calculations.

Although the present invention preferably operates in equivalent time (ET), a concept described in greater detail below, the basic operation of the present invention is better understood in view of the signal representation of FIG. 4A. The signal shown in FIG. 4A represents a digitally sampled signal received and processed by the sampler 32 and signal processor 16.

Figure 4A:
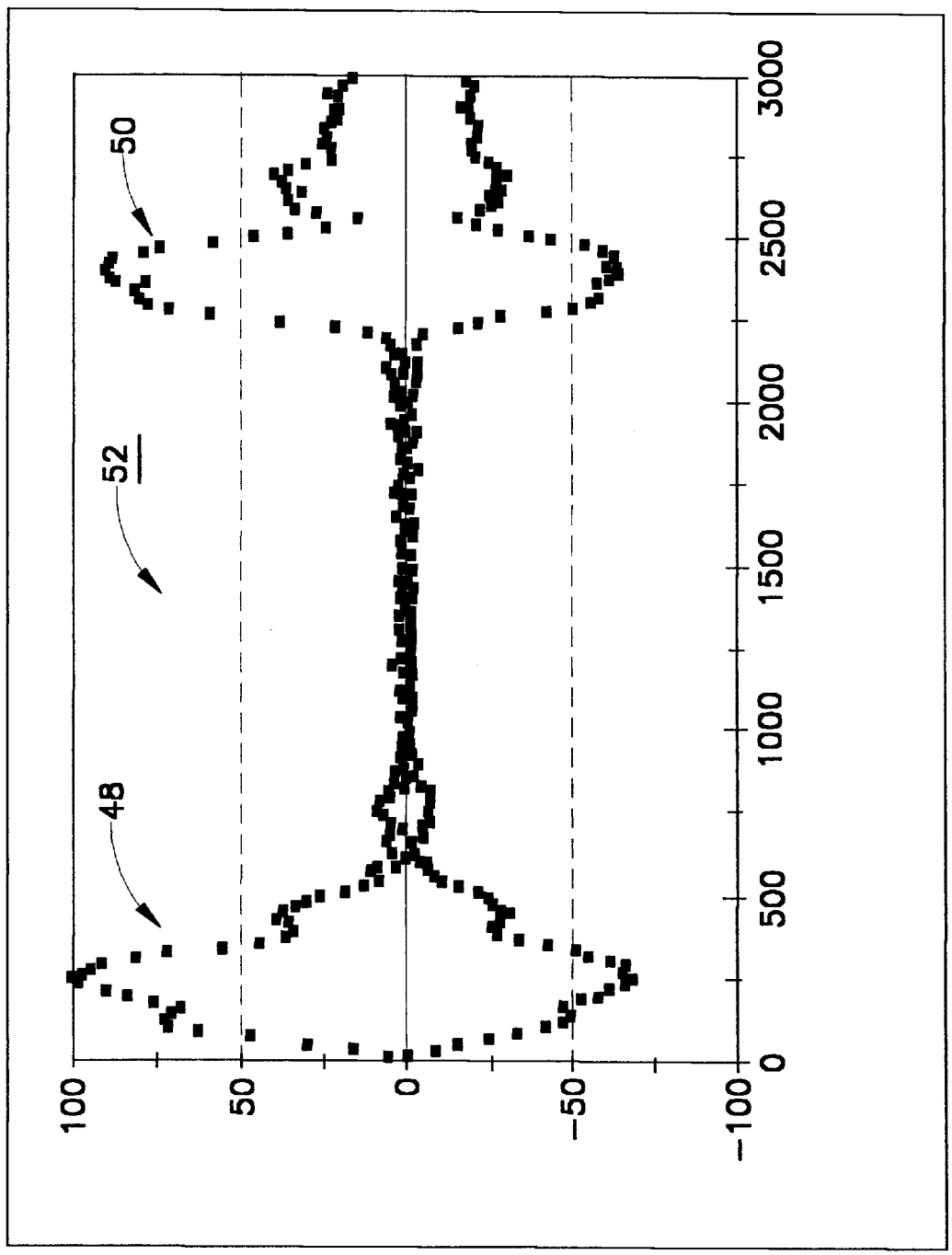
FIG. 4A is a sampled signal corresponding to one scan over a range of delays.

FIG. 4A depicts a sampled representation of a sample signal 52 as received after a transmission pulse, or a series thereof, is transmitted from the transmitter 12. Notably, the vertical axis represents a relative amplitude of the sample signal 52 and the horizontal axis represents the sample number at a point substantially corresponding to triggering the transmission pulse. Preferably, the receive circuitry 30 and sampler 32 cooperate to sample any signals received at the receive antenna 28 for a time at least sufficient to receive a target echo 50. Sampling should begin early enough to receive all if not most of a fiducial echo 48. The sample signal 52 shown in FIG. 4A is depicted as including the fiducial echo 48 between samples 0–500 and the target echo 50 between samples 2200–3000. The distance between select points within the fiducial and target echoes 48, 50 will correspond to a certain number of samples. These samples represent a period of time substantially near transmission of the transmission pulse and receipt of the target echo 50. Importantly, instead of relying on a relatively variable trigger signal, the present invention provides a substantially stable reference for the time a pulse is transmitted. Any electronic drift or variation at the receiver will similarly affect both the fiducial and target echoes 48, 50, thus, substantially eliminating any negative effects of electronic drift.

In order to provide highly accurate determinations of the length of time between receipt of the fiducial and target echoes, the present invention is capable of consistently determining a select reference point on the fiducial and target echoes 48,50 for use in calculating the number of samples or time between receipt of the target and fiducial echoes 48,50. Prior to the present invention, it was difficult to consistently determine the receipt of a target echo and even more difficult to consistently pinpoint when the echo was received. Any inconsistency in determining the time of receipt of the target echo, or any other echo for that matter, would result in error in the time of travel or distance calculations. Furthermore, in non-laboratory conditions, noise in the environment added even greater difficulty to determining an exact point of reference for a received pulse.

The present invention uses reference templates to consistently determine when an echo pulse is received. The template may represent any parameter of a pulse, preferably pulse shape, allowing the processor 16 to align the reference template with a portion of the sampled signal corresponding with an actual echo.

Figure 4C:
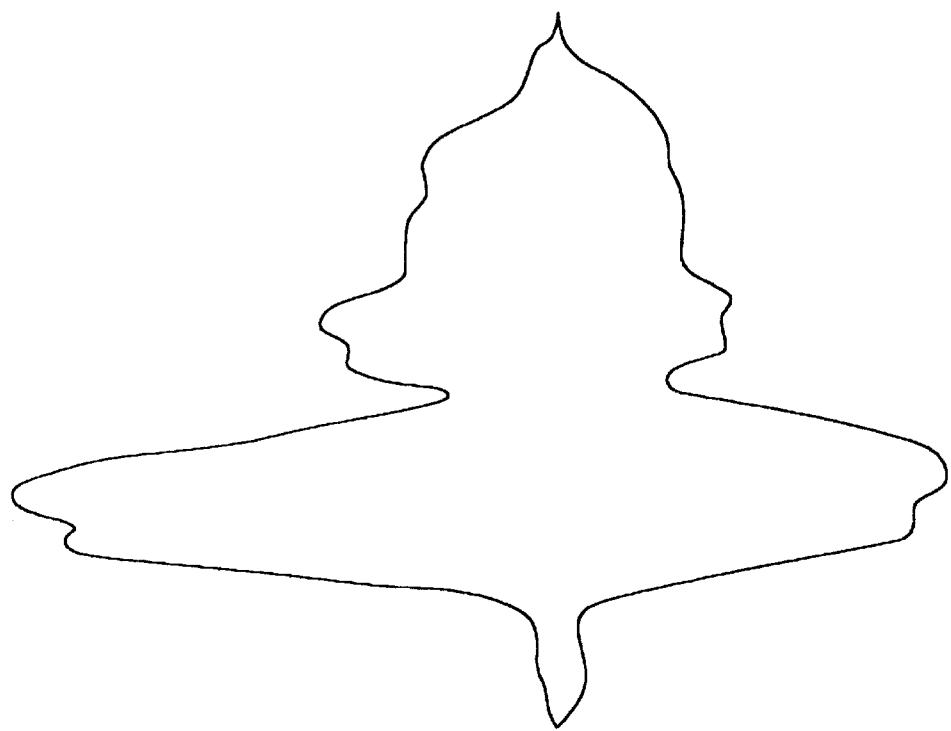
FIG. 4C is representative of a target template for the sample signal of FIG. 4A.
Figure 4B:
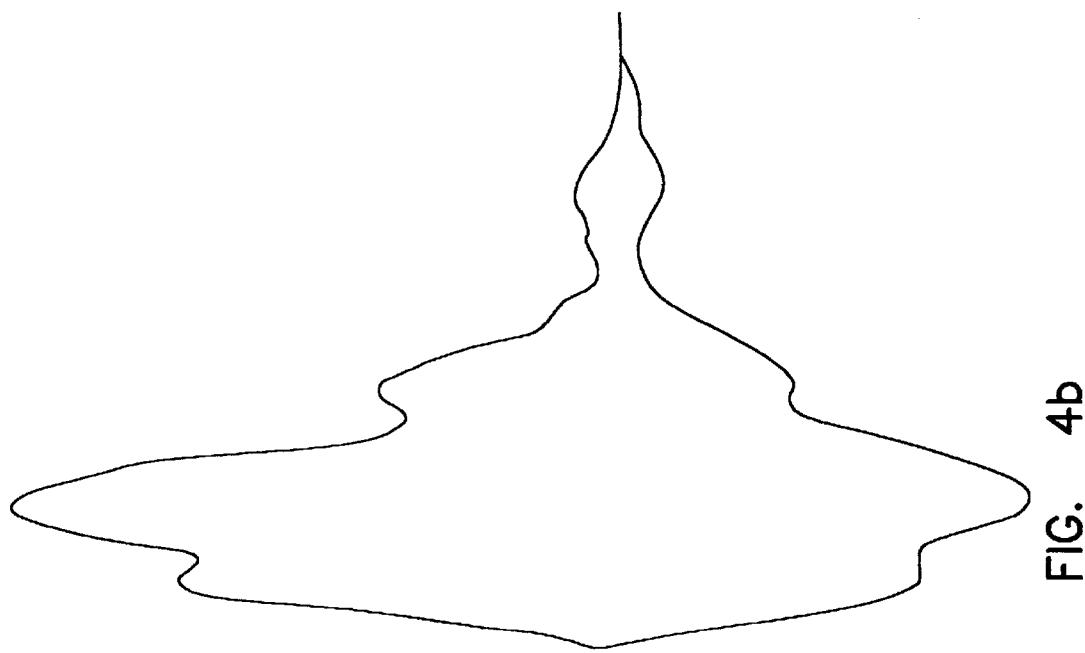
FIG. 4B is representative of a fiduciary template for the sample signal of FIG. 4A.
Figure 5A:
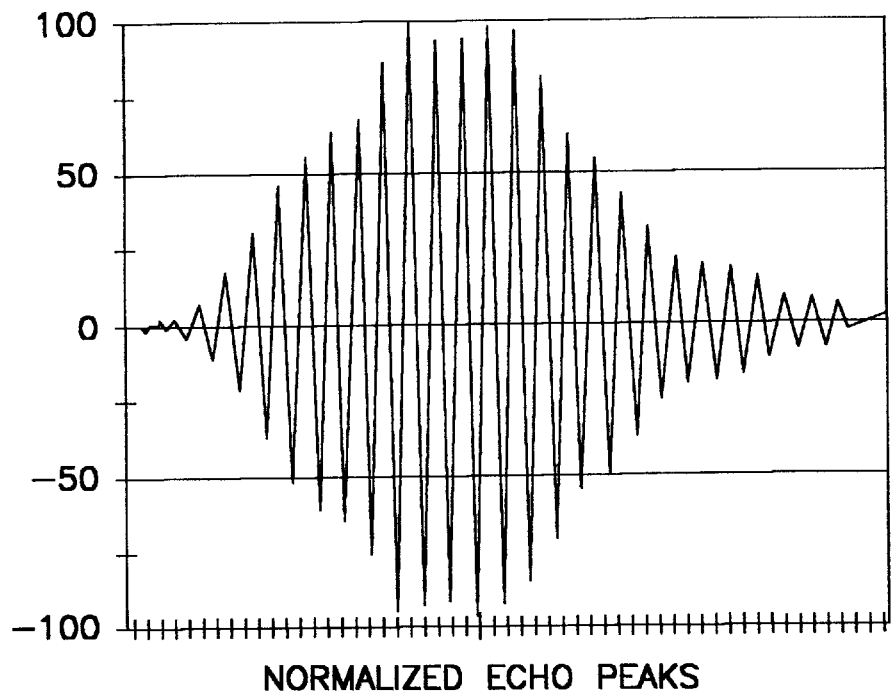
FIG. 5A is a normalized pulse showing sampled echo peaks.

FIGS. 4B and 4C, respectively, depict a fiducial template and a target echo template corresponding to the fiducial and target echoes 48,50 shown in FIG. 4A. The templates may represent part or all of a pulse envelope or shape or simply a series of consecutive peaks having a given relative magnitude. In any case, the templates represent parameters or characteristics of a fiducial or target echo. The templates may be derived during calibration and/or under test conditions. The templates represent a proportional parameter, such as shape, associated with all or a portion of a received echo pulse. Notably, the transmitted pulse and any corresponding echoes will include pulses of any length, including impulses resulting in a Gaussian monocycle. A template corresponding to shape is preferably defined by consecutive sinusoidal peaks occurring along the received pulse. For example, the template is preferably stored in a series of memory locations representing successive positive and negative peak values. A typical template would be similar to the following: −12, 18, −23, 38, −46, 58, −66, 70, −80, 83, −81, 76, −77, 79. Each sample within each echo is preferably a normalized peak value associated with a relative location within the echo pulse. Normalization is required because the parameters, especially the shape of the pulse, remains proportional throughout the range, but the amplitude of the echo pulses will typically decrease as the target moves further away from the device 10. FIG. 5A shows an example of normalized echo peaks determined throughout a given range of delays or scans. Applicants have found that as few a five samples are sufficient along the range to provide reliable templates.

Figure 5B:
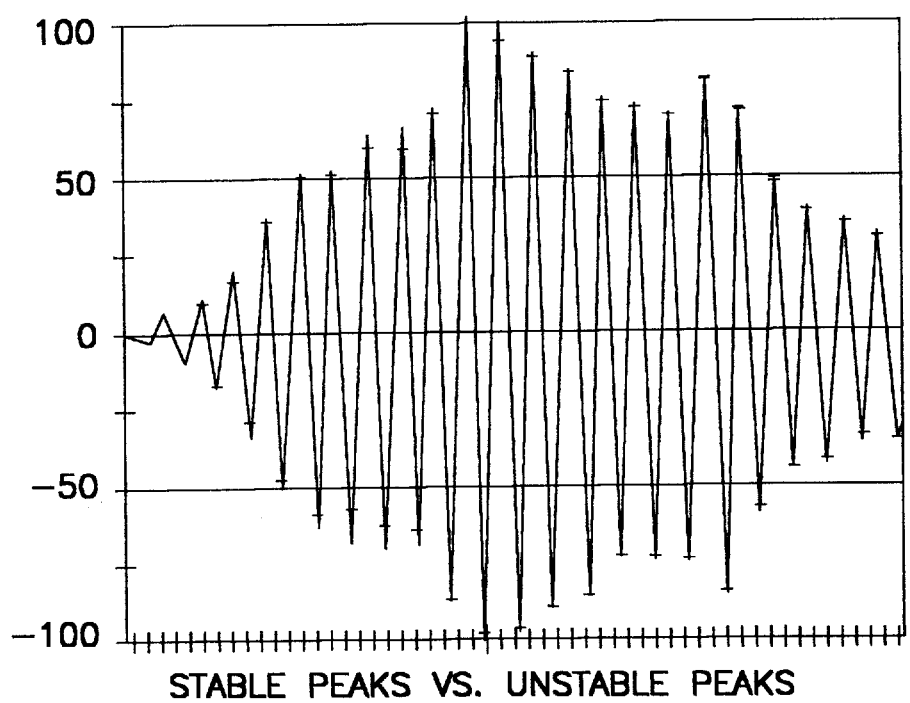
FIG. 5B is a sampled pulse showing normalized echo peaks wherein the leading edge of the pulse includes stable peaks and the trailing portion of the pulse has relatively unstable peaks.
Figure 7A:
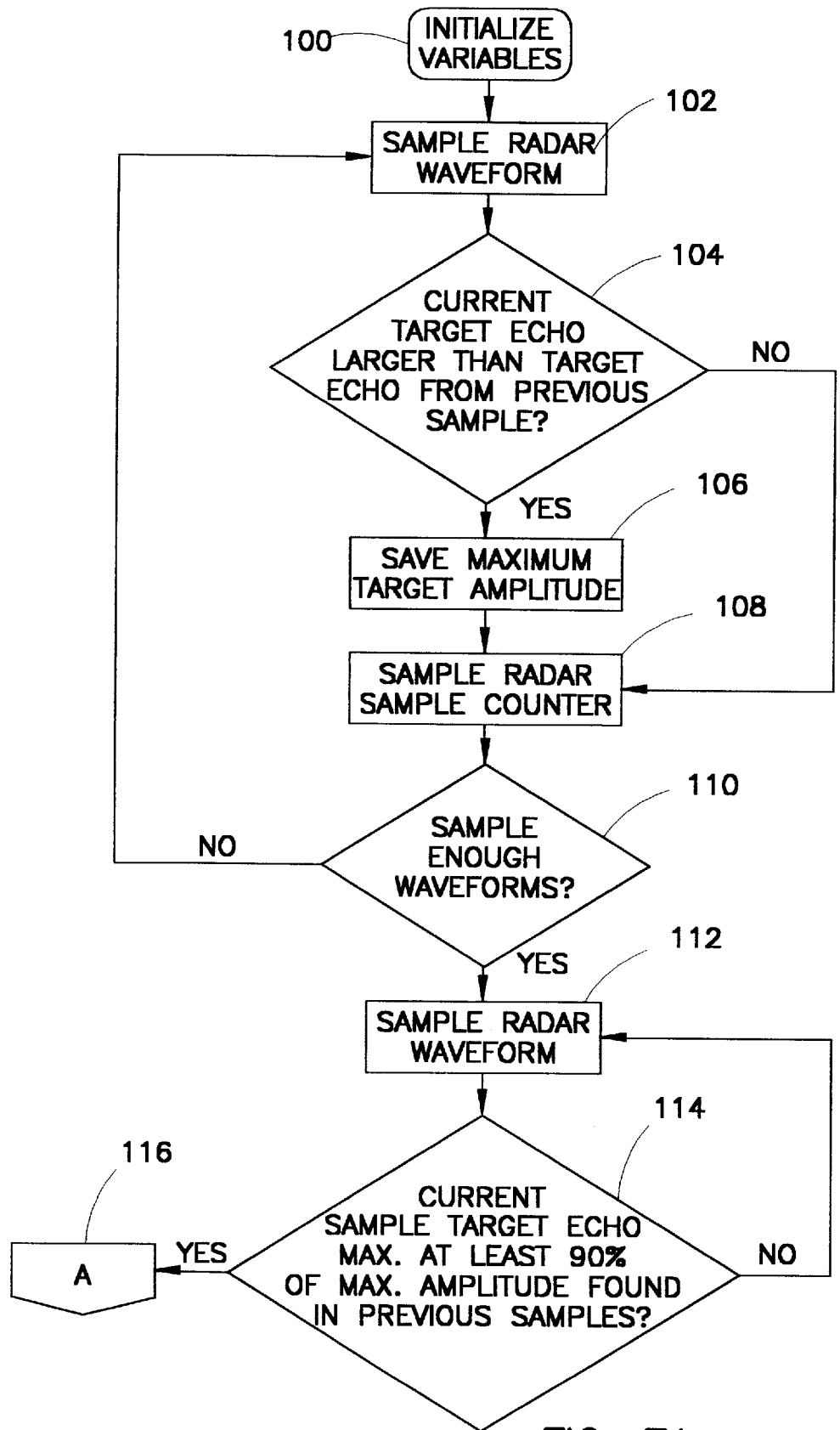
FIGS. 7A–7E are a flow chart of the basic measurement process according to the present invention.
Figure 7B:
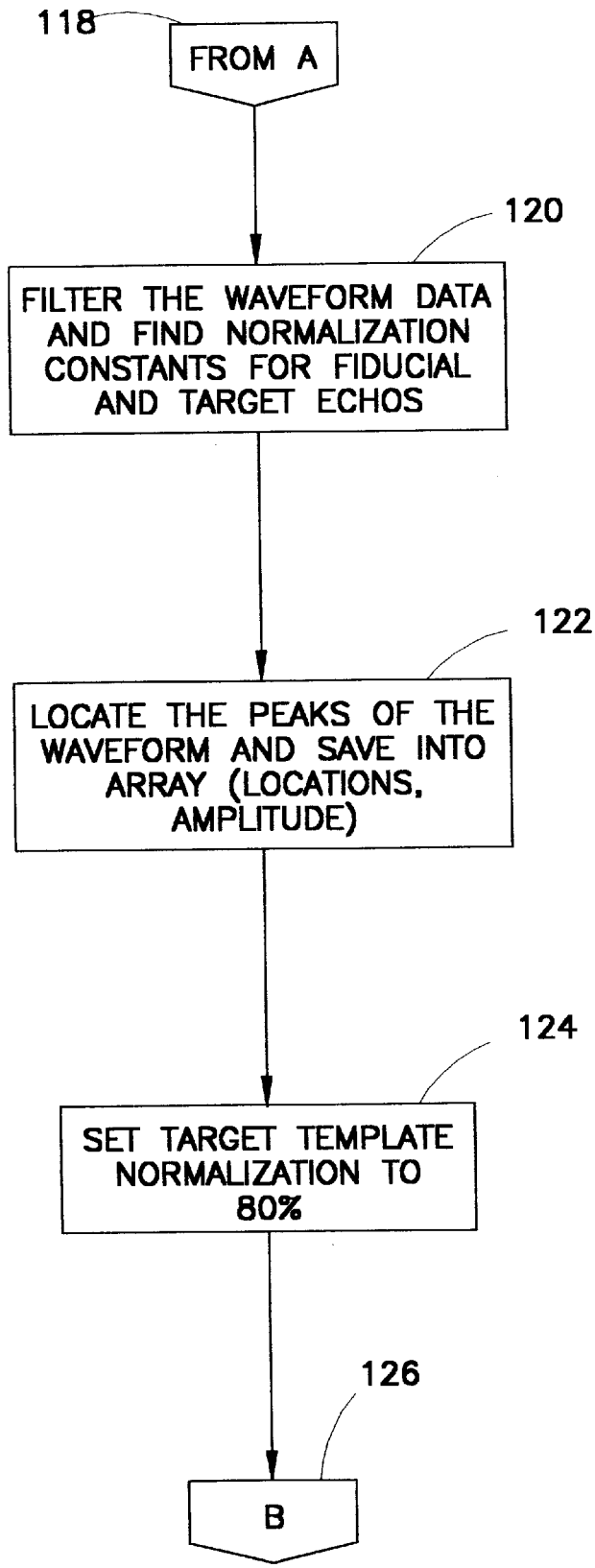
Figure 7C:
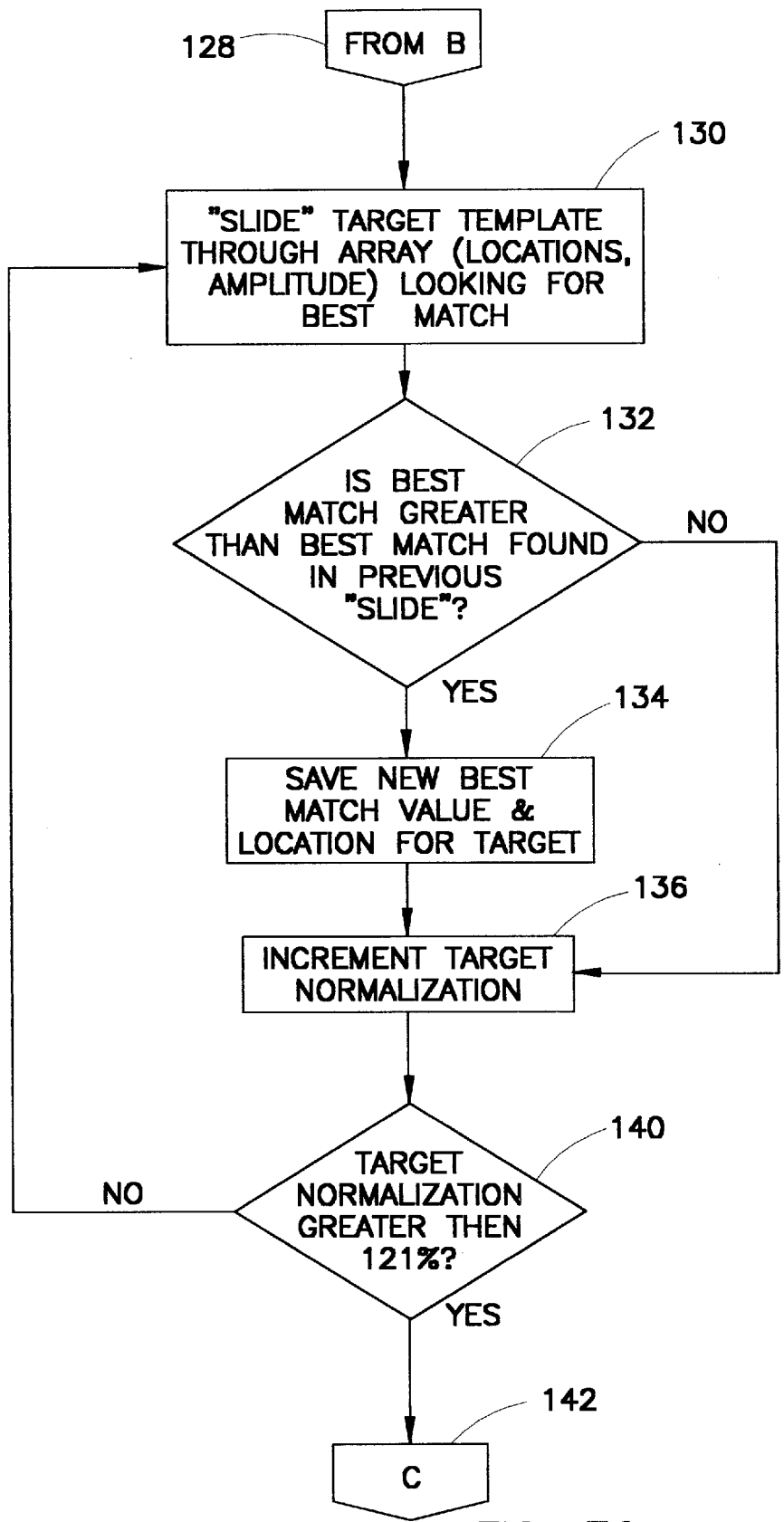
Figure 7D:
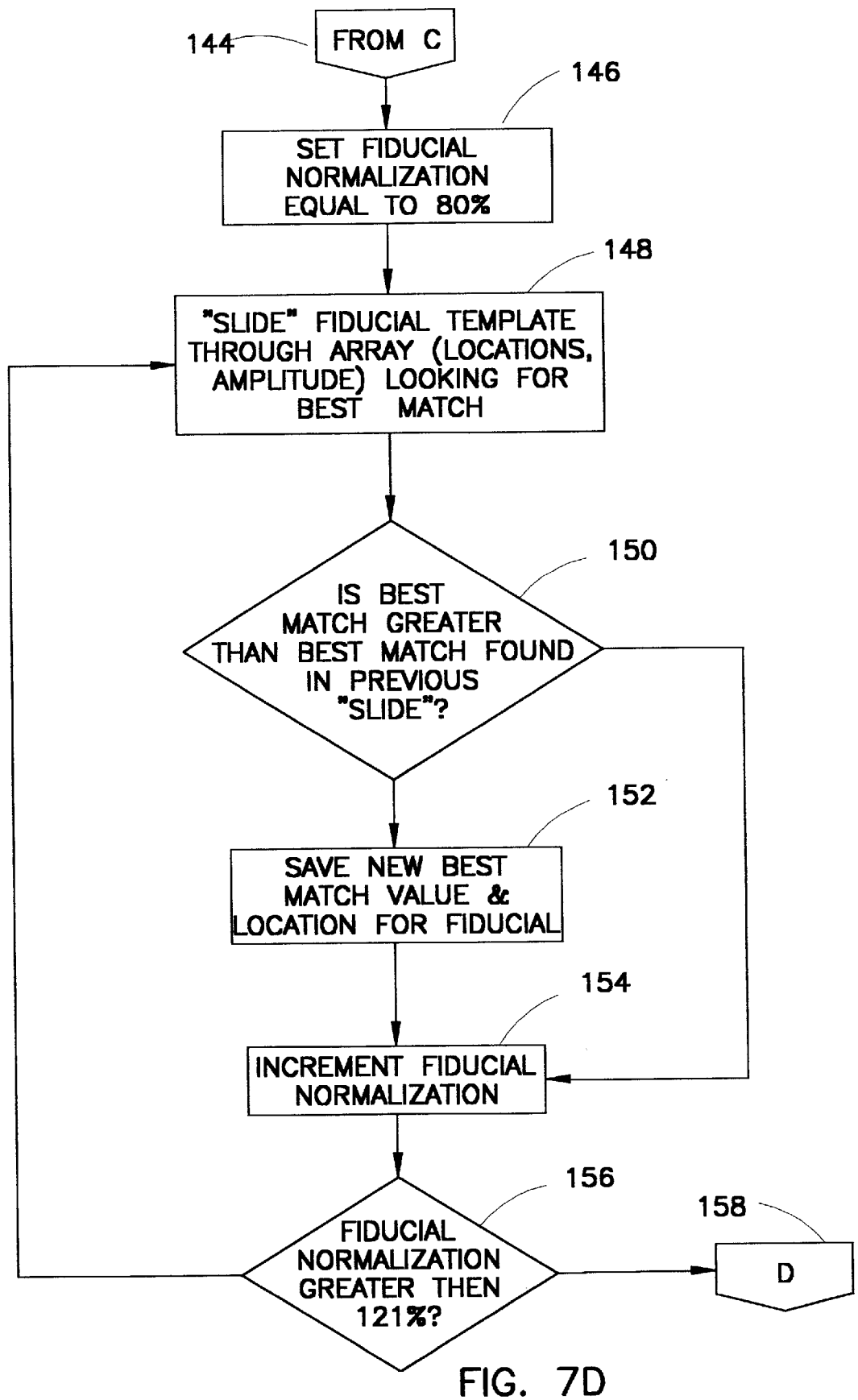
Figure 7E:
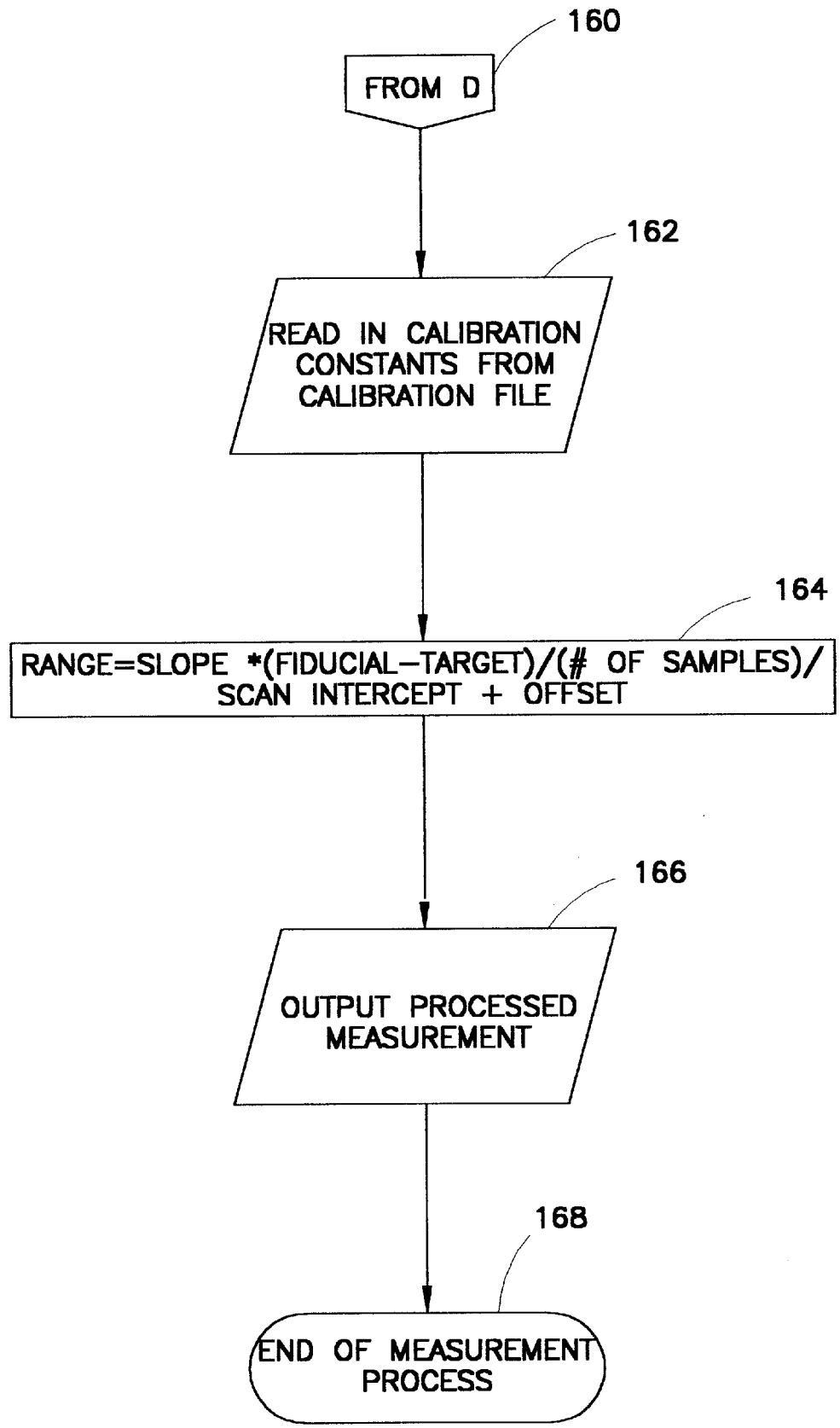

During calibration, those peak points that are most stable throughout the calibration range are identified and used to make up points for the template. Applicants have found for any given unit or pulse, there will be portions of the pulse whose normalized values will closely match, whereas other parts of the pulse may not. Preferably, the template is determined by choosing a continuous set of closely matched peak points whose echoes closely match throughout the range operation. With reference to FIG. 5B, the peaks at the front of the echoes closely match, whereas the ones in the back do not. Thus, a desired template for the example shown would be one matching the front end of the received echo pulse without concern for the back portion of the pulse.

Once the templates have been established, normalized and uploaded, calibration of the unit can begin. Preferably, the unit's calibration constants are determined by recording the location of the fiducial echo and the target echo at several physical locations along the calibration track. The table of FIG. 6A depicts a sample calibration run. In the calibration associated with FIG. 6A, measurements were taken every foot from 3 feet to 10 feet from the device 10. The target and fiducial locations represent a point along the sample signal where the respective templates align with the received pulses. Each scan required approximately 3,140 samples.

The relative time between receipt of the fiducial and target is calculated by subtracting the fiducial location from the target location and optionally dividing by the number of samples. Since the data is linear, the calibration is a linear equation and can be found using linear regression analysis. The regression analysis is shown in FIG. 6B based on the information of the sample calibration run of FIG. 6A. The slope, identified as the "X" coefficient, is 12.323, and the intercept is identified as 0.092. The range to the target is calculated using the following equation:

$$\text{Range} = \text{slope} \times (\text{target location} - \text{fiducial location}) / (\text{samples/scan}) + \text{intercept}$$

The processor 16 is preferably configured to calculate the range to the target using this equation given the calibration values.

In operation, the signal processor 16, sampler 32 and receive circuitry 30 preferably operate to receive and digitize a number of radar scan over a range of delays to find maximum peak amplitude of the target echo for a particular group of scans. In applications where the target surface is continuously variable, more than one scan should be digitized and compared in order to capture at least one usable return scan. If rough water is the target surface, radar energy will be scattered and cause very little return on some scans and relatively high return on others. The number of scans to sample for a maximum peak amplitude should be that to statistically assure at least one usable return echo.

Once the maximum peak amplitude has been established, the processor continues to digitize radar scans until another pulse amplitude is received that is at least 90% of the established maximum peak amplitude. This 90% maximum peak amplitude pulse is the captured scan in which the measurement of the range target will be computed. The signal processor 16 preferably filters the captured scan with a −40 db low pass digital filter with a cut-off frequency of 6 kilohertz. Interpolation may be used between sample points during the filter process or any other point during processing in order to double or triple the resolution of the radar range measurement.

Since normalized templates are used to locate the fiducial and target echoes in the sample signal, the templates and the captured scan, or sample signal must be normalized with respect to one another. Preferably, the processor normalizes the captured scan sample signal using normalizing constants. The target normalizer is preferably equal to the difference between the maximum target peak and the minimum target peak divided by two. Similarly, the fiducial normalizer equals the difference between the maximum fiducial peak and the minimum fiducial peak divided by two. At this point, normalization is considered course because the minimum and maximum peaks used to calibrate for normalization may be atypical.

The location of the target echo is found by "sliding" the normalized target template through the captured scan and looking for the best fit or alignment. The fiducial echo location is located in the same manner. Because the initial normalization of the sampled signal is course, the program repeatedly slides the templates through the captured sampled signal starting at 80% normalization and incrementally adjusts normalization to 120% while keeping track of the best fit location for the final result. Once the fiducial and target locations are determined, the range is computed as a percentage of full scan. Resulting numbers apply to the calibration equation for that particular unit and the processor stores the range measurements in the data logger 34, memory 20 and/or transmits the measurements to a host through the external communication circuitry 36.

FIGS. 7A–7E represent a detailed flow chart of the preferred measurement process. The process begins at block 100 where processor 16 initializes variables for a new measurement process (block 100). After initialization, pulses are transmitted, received and sampled (block 102). The process next determines whether the current target echo is larger than the target echo from the previous sample (block 104). During the first pass through the process, the current target echo value will be initialized to zero. Assuming the current target echo is larger than the target echo from the previous sample, the maximum target amplitude is stored (block 106), and a sample counter is incremented (block 108). As noted, a sufficient number of samples are taken to statistically ensure an echo of sufficient magnitude is received.

Until enough wave forms are sampled, the process will continue to sample the received radar wave form (block 102) and update the maximum target amplitude as necessary (blocks 104–108). Once the number of sampled wave forms is sufficient to ensure that the wave form has sufficient amplitude (block 110), the process continues by sampling additional wave forms (block 112). The processor will determine whether the current sample target echo has a maximum at least 90% of the maximum amplitude found in the initial samples (block 114). If the current sample is less than 90% of the maximum amplitude found above, the process will continue until one of at least 90% of the maximum amplitude is found. The process continues (blocks 116 and 118) wherein the processor filters the wave form data and determines normalization constants for the fiducial and target echoes (block 120).

The processor locates the peaks of the sample wave forms and saves them into an array wherein each peak amplitude is associated with a sample location (block 122). Next, the target echo template is normalized to 80% (block 124), and the process continues through blocks 126 and 128, wherein the processor slides the target template through the array of peak amplitudes to determine a best match, or point along the sample signal where alignment of the target echo and template most likely occurs (block 130).

The processor next determines whether or not the alignment for the 80% normalized target template is better than that found in the previous slide or alignment attempt. During the initial comparison, the best match value is initialized to zero. Assuming the match is better than that found in the previous comparison, the new best match value and location for target is stored in memory (block 134), and the target template normalization is incremented (block 136). The processor will next determine whether the target normalization is greater than 121% (block 140). If the normalization is not greater than 121%, the processor will continue to compare the target template and the current normalization with the sample signal (block 130) to determine if the new normalized template aligns better than the last, and save the new match value and target echo location if the match is better (block 134).

The process continues until the target template normalization is adjusted greater than 121%. The process continues (through blocks 142 and 144) wherein the fiducial echo template is normalized to 80% (block 146). The fiducial template is then slid through the array of signal amplitudes and locations looking for the best match (block 148). If the best match is greater than that found in a previous slide (block 150), the new best match value and location for the fiducial echo is stored (block 152). The normalization for the fiducial template is incremented (block 154) and the process repeats itself until the fiducial template normalization is greater than 121%.

At this point, the processor has incrementally normalized both the fiducial and target templates, repeatedly compared the sampled signal with these templates and determined a "best fit" for the fiducial and target echo templates with respect to corresponding fiducial and target echoes represented in the sampled signal. The relative position of the target and fiducial points are now known. Select locations for each sample represent relative points in the radar scan range where the respective pulses are received regardless of electronic drift or variation.

As the process continues (through blocks 158 and 160), calibration constants are pulled from the calibration file (block 162). These calibration constants and the fiducial and target location points are used to calculate the target range (block 164). Once the range is calculated, the output is processed (block 166), wherein the measurement process comes to an end (block 168).

Notably, there are numerous ways to normalize the sample signal with respect to the target templates. Regardless of the type of normalization used, it is important to properly normalize the sample signal, or the desired portion thereof, with respect to the corresponding template in order to determine the best fit. Where the select template parameters align with those of the sample signals, a precise determination of a point in time where a pulse is received relative to another pulse in the sample signal can be made.

Given the high frequency of the radar pulses, the speed in which they travel and the relative inability of electronics to sufficiently sample these high frequency pulses, the present invention generates an equivalent time (ET) sample signal representing a high frequency signal in a much slower time domain. An equivalent time wave form results from sequentially sampling a real time wave form at pulse repetition intervals. These intervals are typically a few hundred nanoseconds in duration. The pulse repetition interval represents the range of delays for a radar scan in real time.

Figure 8:
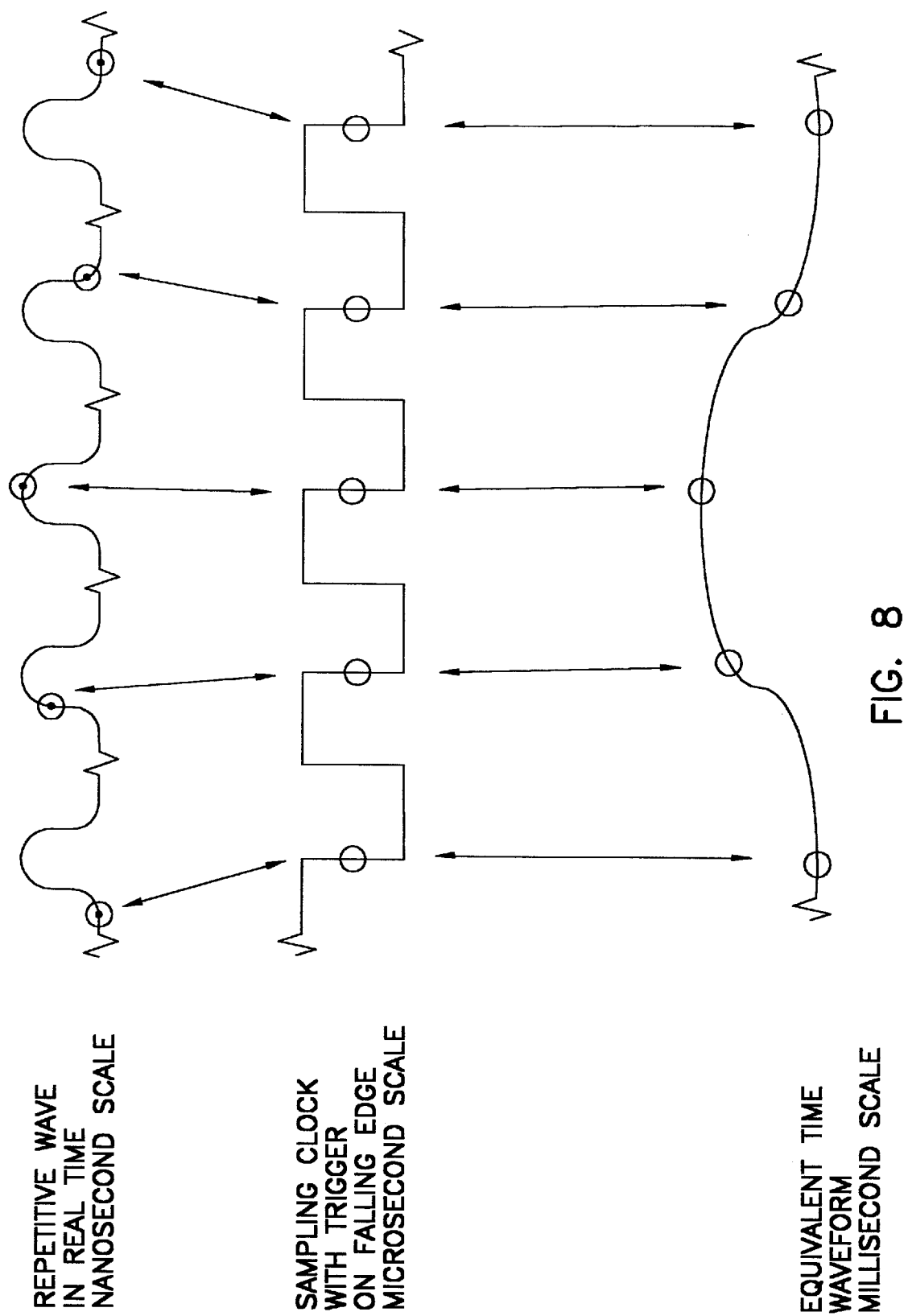
FIG. 8 is a representation of an equivalent time transformation of a real time wave form into an equivalent time wave form.

As shown in FIG. 8, real time operation requires repetition of a real time wave form. The period each repetition is on a nanosecond scale. A sampling clock in the timing circuitry 18 provides a trigger on a microsecond scale substantially corresponding to the pulse repetition interval. With each successive pulse repetition interval, the range delay is incremented slightly. After a large number of pulse repetition intervals and successive increments in the range delay, a complete equivalent time sweep is generated. This sweep results in a sample signal on a millisecond scale representing the repetitive wave form on the nanosecond scale.

In effect, the sampling clock triggers the sampler into sampling a successive slice of each repetitive wave form. If the repetitive wave forms occur fast enough, the equivalent time wave form provides a substantial equivalent time replica of the repetitive wave form in real time. In operation, the device preferably emits approximately two million pulses per second during the sampling phase of the measurement. The sampler samples a successive slice of each echo, thereby reconstructing a down sampled copy of an average return echo. The progression of the scan is slow enough to convert the nanoseconds of true flight time down to milliseconds of effective or equivalent time. Once the effective time echo is down-converted to milliseconds, a commercially available analog to digital converter is used to digitize the radar echo. Preferably, the equivalent time sample signal is processed to determine the location of the fiducial and target echoes as described above.

Attention is drawn to U.S. Pat. Nos. 5,610,611; 5,661,490; and 5,517,198 to McEwan for more details on equivalent time processing and the hardware necessary to down-convert high frequency wave forms into an equivalent time wave form. The supplemental processing provided by the present invention significantly enhances the resolution and distances over which time of flight determinations and distance calculations are capable. Additional information is provided in U.S. Pat. Nos. 5,563,605; 5,523,760; 5,465,094; and 5,345,471, also to McEwan. As noted, each of these McEwan references are incorporated herein by reference and should be considered a part of this disclosure.

Figure 9:
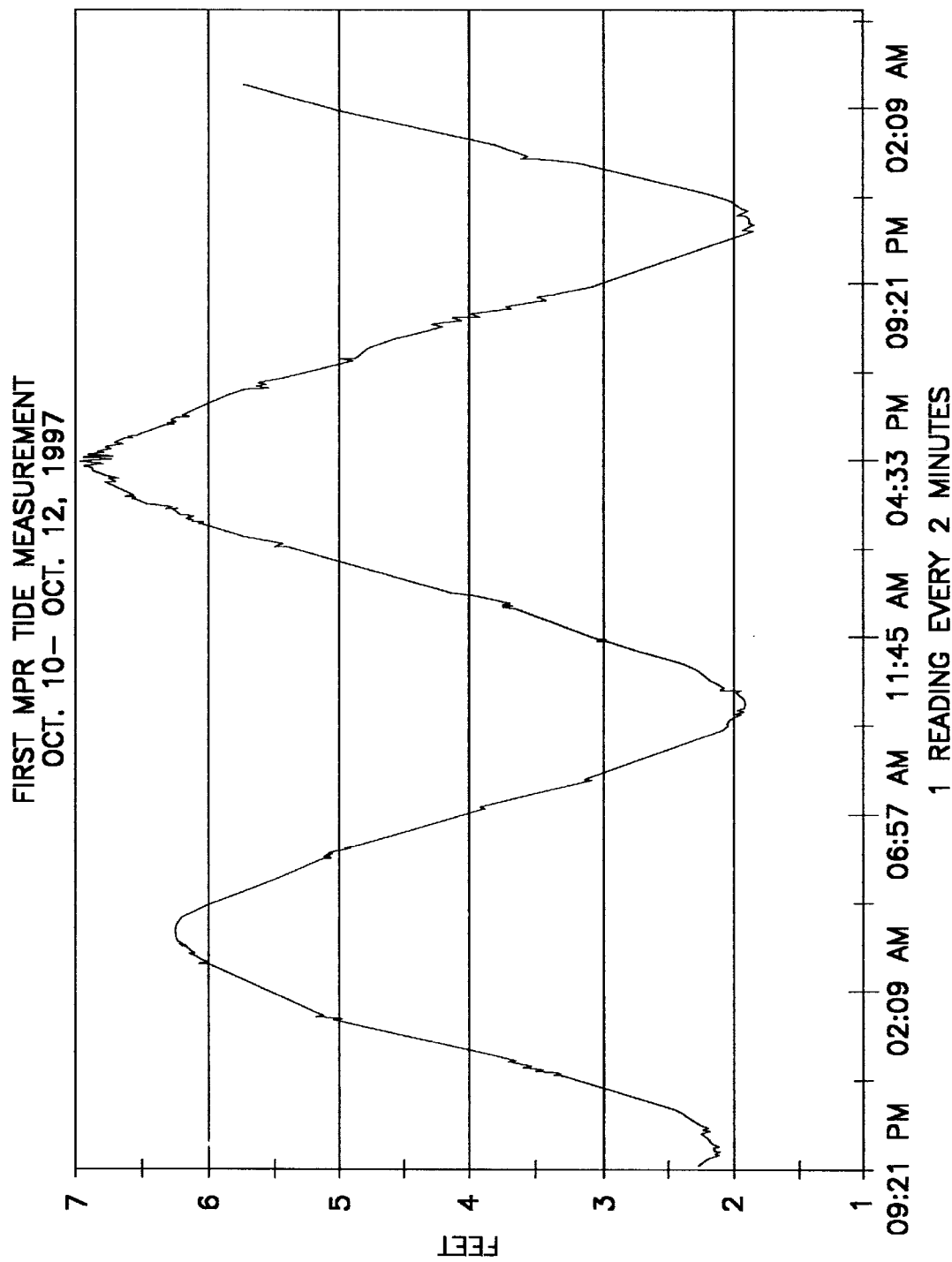
FIG. 9 is a chart of tidal measurements using a micropulse radar device constructed according to the present invention.

FIG. 9 depicts a graph of tidal measurements over a 24-hour period. The micropulse radar device took one reading every two minutes and calculated the magnitude of the tide. Interestingly, the "jitters" along the curve were actual measurements of water traffic and not noise. The graph clearly depicts little or no water traffic during the morning hours and lower traffic during low tides. A significant amount of traffic was recorded during the daylight hours corresponding to high tide.

Thus, in operation, the transmitter transmits a sequence of electronic magnetic pulses in response to a transmit timing signal received from the timing circuitry 18. The receiver samples the sequence of electromagnetic pulses with controlled timing in response to a received timing signal from the timing circuitry 18, and generates a sample signal in response to the samples. The received timing signal causes the receiver to sample the sequence of electromagnetic pulses such that the time between the transmission of pulses into sequence and sampling by the receiver sweeps over a range of delays. The received timing signal sweeps over the range of delays in a sweep cycle such that the pulses in the sequence are sampled at the pulse repetition rate with slightly incrementing delays in the range of delays to produce a sample signal representing the magnitude of received pulse in equivalent time. The equivalent time sample signal is processed according to the present invention to determine the precise location of the fiducial and target echo in order to precisely determine the amount of time the transmitted pulse was in flight before being received by the receiver.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. A system for measuring the distance an electromagnetic pulse travels comprising:
    a) a transmitter adapted to transmit a sequence of electromagnetic pulses in response to a transmit timing signal;
    b) a receiver adapted to sample the sequence of electromagnetic pulses in response to a receive timing signal and generate a sample signal;
    c) a timing circuit adapted to supply the transmit timing signal to the transmitter and generate the receive timing signal, the receive timing signal causing the receiver to sample the sequence of electromagnetic pulses such that time between transmission of pulses in the sequence and sampling by the receiver sweeps over a range of delays;
    d) a processor with associated memory including a reference pulse template representing a parameter of a received reference pulse, said processor adapted to;
        i) compare said reference template and said sample signal;
        ii) align said reference pulse template with a corresponding parameter of the sample signal; and
        iii) determine a point along the range of delays where alignment occurs wherein the point along the range of delays at which a pulse is received is proportional to the distance a received pulse travels.

2. The system of claim 1 wherein the transmit timing signal causes the transmitter to transmit the sequence of electromagnetic pulses at a pulse repetition rate, and wherein the receive timing signal sweeps over the range of delays in a sweep cycle such that pulses in the sequence are sampled at the pulse repetition rate and with different delays within the range of delays wherein the sample signal represents the received pulse in equivalent time.

3. The system of claim 1 wherein said transmitter is coupled to a transmit antenna adapted to transmit pulses in a first direction and said receiver is coupled to received antenna adapted to receive pulses transmitted from said transmitter after being reflected off a target surface from a second direction substantially opposite said first direction.

4. The system of claim 3 wherein said antennas are mounted substantially adjacent one another on opposite sides of a transmission barrier adapted to minimize reception of ghost signals at said receiver.

5. The system of claim 3 wherein said antenna are mounted behind a wall substantially transparent to electromagnetic energy such that pulses may be transmitted and received through said wall.

6. The system of claim 5 wherein said wall reflects a portion of each transmitted pulse to the receive antenna such that the receiver receives:
    a) a fiducial pulse reflected of said wall substantially immediately upon transmission of a pulse; and
    b) an echo pulse reflected off of said target surface after a period time necessary for the transmitted pulse to return to said receiver.

7. The system of claim 6 wherein said memory further includes a fiducial pulse template representing a parameter of a received fiducial pulse, said processor further adapted to:
    a) compare said fiducial pulse template and said sampled signal;
    b) align said fiducial pulse template with a corresponding parameter of the received fiducial pulse in said sample signal;
    c) determine a fiducial point along the range of delays where alignment occurs; and
    d) calculate the difference between the fiducial point and the reference point, the difference being proportional to the distance the received pulse travels.

8. The system of claim 1 wherein said parameter of said pulse and said reference pulse template relate to pulse shape such that alignment occurs when said parameter and said template best match.

9. The system of claim 1 wherein said parameter of said pulse and said reference pulse template relate to peak amplitudes of said pulse and said reference pulse template.

10. The system of claim 8 wherein said pulse shape is substantially defined by sequential peak amplitudes of sinusoidal pulse such that said parameter includes of a series of peak values and said reference pulse template includes a series of peak values, said processor adapted to compare corresponding values along said range of delays and determine a closest overall fit to determine the point where proper alignment occurs.

11. The system of claim 1 wherein one of said sample signal and said reference pulse template is normalized with respect to the other to facilitate comparison and alignment of the parameter of said sample signal and said reference pulse.

12. The system of claim 1 wherein said reference pulse template includes a series of peak values indicative of a shape of at least a portion of a reference pulse and the parameter of the received sample signal is indicative of a shape of at least a corresponding portion of a received pulse such that said processor compares the shape of the reference pulse template with the sampled signal to align the reference pulse template with a corresponding shape parameter of the sampled signal to determine the point along the range of delays at which a pulse is received.

13. The system of claim 7 wherein:
a) said reference pulse template includes a series of peak values indicative of a shape of at least a portion of a reference pulse and the parameter of the received sample signal is indicative of a shape of at least a corresponding portion of a received pulse such that said processor compares the shape of the reference pulse template with the sampled signal to align the reference pulse template with a corresponding shape parameter of the sampled signal to determine the point along the range of delays at which an echo pulse is received; and
b) said fiducial pulse template includes a series of peak values indicative of a shape of at least a portion of a fiducial pulse and the parameter of the received sample signal is indicative of a shape of at least a corresponding portion of a received pulse such that said processor compares the shape of the fiducial pulse template with the sampled signal to align the fiducial pulse template with a corresponding shape parameter of the sampled signal to determine the point along the range of delays at which a fiducial pulse is received.

14. A system for measuring the distance of target comprising:
a) a transmitter adapted to transmit a sequence of electromagnetic pulses in response to a transmit timing signal toward a target;
b) a receiver mounted substantially adjacent said transmitter and adapted to:
  i) sample a substantially immediate, fiducial reflection of the sequence of electromagnetic pulses and a sequence of return echoes of the sequence of electromagnetic pulses reflected from the target in response to a receive timing signal; and
  ii) generate a sample signal;
c) a timing circuit adapted to supply the transmit timing signal to the transmitter and generate the receive timing signal, the receive timing signal causing the receiver to sample the sequence of electromagnetic pulses such that time between transmission of pulses in the sequence and sampling by the receiver sweeps over a range of delays;
d) a processor with associated memory including an echo pulse template representing a parameter of a received echo pulse and a fiducial pulse template representing a parameter of a fiducial reflection, said processor adapted to;
  i) compare said reference template and said sample signal;
  ii) align said reference pulse template with a corresponding parameter of the sample signal;
  iii) determine a point along the range of delays where alignment occurs;
  iv) compare said fiducial pulse template and said sampled signal;
  v) align said fiducial pulse template with a corresponding parameter of the received fiducial pulse in said sample signal;
  vi) determine a fiducial point along the range of delays where alignment occurs;
  vii) calculate the difference between the fiducial point and the reference point wherein the difference is proportional to the distance between the system and the target.

15. The system of claim 14 wherein the transmit timing signal causes the transmitter to transmit the sequence of electromagnetic pulses at a pulse repetition rate, and wherein the receive timing signal sweeps over the range of delays in a sweep cycle such that pulses in the sequence are sampled at the pulse repetition rate and with different delays within the range of delays wherein the sample signal represents the received echo and fiducial pulses in equivalent time.

16. The system of claim 15 wherein said processor normalizes said templates to said respective parameters of said sample signal.

17. The system of claim 15 wherein said parameters and said templates relate to a shape of at least a portion of a pulse.

18. The system of claim 15 wherein said parameters and said templates relate to amplitudes of a portion of a pulse.

19. The system of claim 14 wherein said transmitter, receiver and processor are in a substantially enclosed container having a shielding partition separating said transmitter and receiver and a first outside wall configured to substantially pass the transmitted pulses and the reflected echo pulses.

20. The system of claim 19 wherein said processor further includes means to communicate received and processed data to a remote location.

21. A method system for measuring the distance an electromagnetic pulse travels comprising:
a) transmitting a sequence of electromagnetic pulses in response to a transmit timing signal;
b) sampling an echo from a target of the sequence of electromagnetic pulses in response to a receive timing signal;
c) generating a sample signal;
d) supplying the transmit timing signal to the transmitter and generating the receive timing signal to cause the sampling of the sequence of electromagnetic pulses such that time between transmission of pulses in the sequence and sampling sweeps over a range of delays;
e) comparing a reference pulse template representing a parameter of a received reference pulse and the sample signal;
f) aligning the reference pulse template with a corresponding parameter of the sample signal; and
g) determining a point along the range of delays where alignment occurs wherein the point along the range of delays at which a pulse is received is proportional to the distance a received pulse travels.

22. The method of claim 21 wherein the transmitting step further includes:
a) transmitting the sequence of electromagnetic pulses at a pulse repetition rate; and
b) sweeping over the range of delays in a sweep cycle such that pulses in the sequence are sampled at the pulse repetition rate and with different delays within the range of delays wherein the sample signal represents the received pulse in equivalent time.

23. The method of claim 21 wherein the sampling step further includes sampling substantially immediate, fiducial reflections of the sequence of electromagnetic pulses and the method further comprises:

a) comparing a fiducial pulse template representing a parameter of a received fiducial pulse and said sampled signal;
b) aligning said fiducial pulse template with a corresponding parameter of the received fiducial pulse in said sample signal;
c) determining a fiducial point along the range of delays where alignment occurs; and
d) calculating the difference between the fiducial point and the reference point, the difference being proportional to the distance the received pulse travels.

24. A method for transmitting a pulse signal to a target and identifying the return time of reflected signal received from a target comprising:
a) transmitting a signal comprised of a plurality of pulses to a target;
b) receiving a plurality of return signals;
c) selecting a test signal meeting a predetermined parameter; and
d) comparing the signal with a template of a desired reflected signal at different return times to select the time at which the match between the signal and the desired reflected signal have the closest match.

25. The method of claim 24 wherein said predetermined parameter is amplitude.

26. The method of claim 24 wherein said predetermined parameter is shape.

27. The method of claim 24 wherein said test signal is selected by receiving a plurality of signals, selecting a first signal with a predetermined parameter from the plurality of signals, receiving additional signals, and selecting as the test signal a second signal having said predetermined parameter within a given percentage of the predetermined parameter of the first scan.

28. The method of claim 24, wherein said signals are converted from analog to digital.

29. The method of claim 24, wherein said test signal is time elongated.

30. The method of claim 24, wherein said signals are normalized.

31. The method of claim 24, wherein said template is produced by sampling reference pulses off a reference target.

32. The method of claim 24, wherein said pulse signal is a radio frequency signal having a sinusoidal component.

33. A method for determining the distance to a target using a pulse signal comprising:
a) transmitting a signal comprised of a plurality of pulses to a target at a given transmission time;
b) receiving a plurality of return signals;
c) selecting a test signal meeting a predetermined parameter;
d) comparing the signal with a template of a desired reflected signal at different return times to select the time at which the match between the signal and the desired reflected signal have the closest match, said time being the reflected signal return time; and
e) calculating the distance to the target from the device from the transmission time and the reflected signal return time.

34. The method of claim 33 wherein said given transmission time is determined by receiving a portion of said signal at the time the signal is transmitted.

35. A method for determining the distance to a target using a high frequency radio pulse signal comprising:
a) transmitting a radio frequency signal comprised of a plurality of pulses toward a target;
b) capturing a segment of the transmitted signal to determine the signal transmission time;
c) receiving and digitizing a plurality of radar scans;
d) selecting a first scan with the maximum peak amplitude from the plurality of radar scans;
e) receiving and digitizing additional radar scans;
f) selecting a second scan having the peak amplitude within a given percentage of the peak amplitude of the first scan;
g) filtering the second scan to remove amplitudes outside of a given frequency range;
h) normalizing the second scan using the formula (max. peak amplitude minus min. target peak)/2;
i) comparing the second scan with a template of a normalized desired reflected signal at different return times to select the time at which the match between the second scan and the template have the closest match as the reflected signal return time; and
j) calculating the distance to the target as a percentage of the full scan.

* * * * *